United States Patent [19]

Nilsson et al.

[11] Patent Number: 4,609,054

[45] Date of Patent: Sep. 2, 1986

[54] ANTI-NOISE IMPACT ELEMENT

[76] Inventors: Göran Nilsson, P.O. Box 62, 829 22 Sandarne; Kjell Edström, Asbacksgatan 45, 826 00 Soderhamn; Henry Wiklund, Backvagen 1, 820 10 Arbra, all of Sweden

[21] Appl. No.: 187,846

[22] PCT Filed: Jan. 10, 1979

[86] PCT No.: PCT/SE79/00003

§ 371 Date: Sep. 7, 1979

§ 102(e) Date: Sep. 7, 1979

[87] PCT Pub. No.: WO79/00496

PCT Pub. Date: Aug. 9, 1979

[51] Int. Cl.[4] .......................... A01B 33/00; A01B 5/00

[52] U.S. Cl. .................................... 173/118; 173/119; 173/139

[58] Field of Search ............... 173/118, 119, 122, 139; 92/84

[56] References Cited

U.S. PATENT DOCUMENTS

| | | | |
|---|---|---|---|
| 931,964 | 8/1909 | Scott | 92/84 X |
| 1,740,818 | 12/1929 | Killingsworth | 92/84 |
| 2,161,062 | 6/1939 | Killgore | 262/33 |
| 2,427,358 | 9/1947 | Kovach | 92/84 X |
| 2,628,599 | 2/1953 | Wilson et al. | 173/139 X |
| 3,326,303 | 6/1967 | Jones, Jr. | 173/119 |
| 3,399,928 | 9/1968 | Robbins | 173/118 X |
| 3,450,215 | 6/1969 | Emery | 173/118 X |
| 3,735,822 | 5/1973 | Deike | 173/118 |
| 4,088,062 | 5/1978 | Nilsson et al. | 91/50 |
| 4,117,764 | 10/1978 | Nilsson et al. | 91/50 |

FOREIGN PATENT DOCUMENTS

| | | | |
|---|---|---|---|
| 1172197 | 6/1964 | Fed. Rep. of Germany . | |
| 2710920 | 9/1977 | Fed. Rep. of Germany | 173/139 |
| 1425153 | 12/1965 | France | 173/139 |
| 560587 | 4/1975 | Switzerland | 173/139 |
| 259592 | of 1926 | United Kingdom | 173/118 |
| 1286518 | 8/1972 | United Kingdom . | |
| 175463 | 7/1965 | U.S.S.R. | 173/118 |
| 321623 | 2/1972 | U.S.S.R. | 173/139 |

*Primary Examiner*—Wm. Carter Reynolds
*Attorney, Agent, or Firm*—Eric Y. Munson

[57] ABSTRACT

An impact element having the effect of elongating the pulse of force in impact tools and devices for chipping, hammering and similar operations, consisting of an element (8) which, for generating the striking motion, is axially moveable as a whole and comprises a driving mass (16) intended to be actuated by a propelling force, and a striking mass (17) located in front thereof relative to the direction of striking, which masses possess a limited freedom of axial movement with respect to each other in that they are coupled together by a stiff spring arrangement, e.g. cup washers (15), extremely hard plastics or gas cushions.

8 Claims, 4 Drawing Figures

ANTI-NOISE IMPACT ELEMENT

Problems are caused at a variety of workplaces, such as engineering shops etc., by disturbing and harmful noise from tools of impact type such as, on the one hand, pneumatic chipping hammers, scaling hammers and the like, and on the other hand, manually powered tools such as hammers, sledge-hammers and the like. The present invention is concerned with an impact element for tools and devices of impact type which in its mode of action brings about an acoustically damping elongation of the pulse of force.

The collision of two masses (in air) generates a pulse of force the shape of which is a function primarily of the power expended and of the rigidity of the colliding masses. The power expended is dependent primarily on the opposed kinetic energies of the masses and on the duration of the collision. The rigidity depends mainly on the properties of the materials constituting the masses—and the points of the latter involved in the collision—as well as on the area of the colliding faces and the duration of the collision. The usual energy losses are in the form of an air wave, a temperature rise, structure-borne sound vibrations and acoustic wave propagation. Irrespective of the purpose of the collision and of the means by which it is brought about—i.e. irrespective of whether the technical application is chipping, hammering etc., —the pulse of force is the primary factor both with regard to the technical performance and to noise generation.

A pulse of force representing a quantity of kinetic energy given up by an impact element can be illustrated graphically, as shown in FIG. 3 appended hereto, by a graph with a vertical force axis and a horizontal time axis. The curve of the pulse rises, while moving along the time axis, from zero to a peak value and then falls back to zero, at which stage the whole of the energy has been given up. The *area* enclosed between the curve and the time axis represents the quantity of energy given up. Curves 1 and 2 on the graph enclose approximately the same area, i.e. they represent the same amount of energy. Curve 1 illustrates a rapid pulse, where the area representing the energy has a short extension along the time axis and consequently reaches a higher maximum along the force axis, while Curve 2 shows a pulse having a greater extension in time and a lower maximum level of force. In an operation such as the removal of welding scale from sheet steel by means of a pneumatic scaling hammer fitted with a chisel and of conventional type without a pulse elongating device, the curve of the pulse obtained approximates to Curve 1. The high maximum level is advantageous for the technical performance, i.e. the working efficiency of the tool, but it also gives a steeply rising and falling curve with a short extension along the time axis, resulting in a high noise level. Thus the problem to be solved is to shape the curve so as to obtain, on the one hand, an adequate maximum level of force and, on the other hand, suitable curve gradients with respect to the time axis at all phases of the force cycle so as to achieve both satisfactory technical performance and also acoustic damping.

The pulse of force is composed of numerous sinusoidal vibrations which in combination determine the shape of the pulse. By modification of the pulse some of the component vibrations can be eliminated or reduced. If certain frequencies are absent from the pulses of force delivered, for example, to a metal plate by a scaling hammer or similar tool, this implies that vibrations of these frequencies will not be excited in the plate (the so-called structure-borne sound) and, further, that the radiated air-borne noise will lack these components. Which frequencies it is most desirable to eliminate or reduce depends on the work being performed. In the case of work with a pneumatic scaling hammer the most troublesome frequencies are generally those between 1000 Hz and 4000 Hz. In the case of the impacts of a sledge-hammer on a large metal plate the acoustic spectrum is dominated by lower frequencies.

The above-mentioned problem of suitably modifying the shape of the pulse is solved with the impact element of the invention by endowing it with the characteristics specified hereafter in the claims.

It is a known practice in mechanical pile-driving to use a pile helmet on top of the pile to modify the impact wave or pulse of force transmitted via the ram and the helmet to the pile, with the object of increasing energy efficiency in pile-driving. Attempts have also been made on a similar principle—by placing an elastic, yielding mass such as polyurethane rubber between the impact piston and the chisel shank—to modify the form of the pulse in conventional types of pneumatic scaling hammers for the purpose of reducing noise generation. The type of scaling hammer referred to operates with a moving mass in the form of a piston which strikes against the shank of a chisel mounted in one end of the scaling hammer and applied to the workpiece. The striking frequency is usually between 70 and 100 impacts per second. The pulse of force arises as the piston makes contact with the chisel shank and propagates to the point of the chisel. It takes the form of a wave of compression traveling up into the piston and a tensile wave returning down to the chisel shank. The chisel transmits a wave of compression only, the duration of which is determined by the length and shape of the piston. As the pulse propatates in steel with a velocity of approximately 5000 m/s and practical considerations preclude varying the length of the piston by more than a few centimeters at the most, it is not feasible to modify the shape of the pulse in any significant degree by increasing the length of the piston. A spring arrangement in the form of a striking pad on top of the chisel shank or some other form of spring arrangement, which might conceivably be incorporated in the piston or the chisel, will increase the duration of the impulse. However, a large part of the impact energy delivered by the piston is thereby lost, that is to say, only a limited amount of the said energy is transmitted to the point of the chisel. Considerable problems are also met in getting the elastic material to withstand the impacts of the piston. Since a scaling hammer, like other similar hand-held tools, must in order to be manageable be kept with fairly narrow limits of size and weight, it is difficult, if indeed possible at all, to modify the design of the tool in such a way as, on the one hand, to increase the impact energy delivered by the piston to compensate for the above-mentioned losses and, on the other hand, to provide sufficiently large striking faces for the elastic material to withstand the impacts. Therefore, the said attempts have not led to any practical result in the form of new, acoustically damped tools, and the problem has been regarded as more or less insoluble in practice.

In the present invention the problem has been attacked from another angle, as will be described in further detail hereafter with reference to the appended drawings. Of the latter, FIG. 1 is a side view, partly cut away, of an application of the invention to a pneumatically powered chipping tool.

Figure 1:
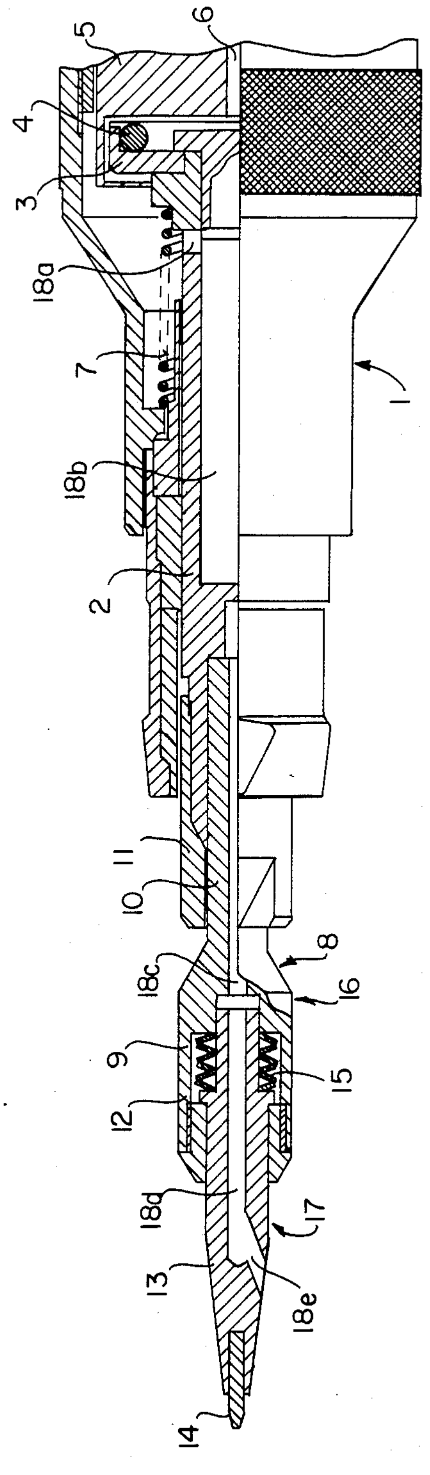

The embodiment of the invention exemplified in FIG. 1 shows one end of a pneumatic chipping tool, such as a scaling hammer, denoted 1 in the drawing. The tool is provided with a driving mechanism of the type described in detail in the applicants' Swedish Patent Application No. 7503970-1 (corresponding to U.S. Pat. No. 4,088,062, issued May 9, 1978) and Swedish Patent Application No. 7603252-3, now Swedish Pat. No. 406,875 issued June 14, 1979 (corresponding to U.S. Pat. No. 4,117,764, issued Oct. 3, 1978). The driving mechanism comprises an axially moveable impact piston 2, terminating at its rear end relative to the direction of striking in a broadened, plate-shaped end piece 3 which together with an O-ring 4 seals a driving compartment formed between the plate-shaped end piece and an element 5. Compressed air is fed into the driving compartment via a pipeline 6. Inasmuch as the O-ring 4 acts as a valve which alternately seals and opens the driving compartment radially, the impact piston 2 will alternately be driven forward by the air pressure and back by a spring 7.

The number 8 is used as a general designation for the impact element of the invention. This consists, in the embodiment illustrated in FIG. 1, of the impact piston 2 and of a chisel unit 9 the rod 10 of which is inserted into the impact piston and rigidly united thereto by the nut 11. The chisel unit 9 consists, apart from the rod 10, of a housing 12 in which the chisel 13 is mounted. Inserted in the chisel 13 is a chisel bit 14 of hard metal. The chisel 13 and the housing 12 have a limited axial freedom of movement with respect to each other provided by a stiff spring arrangement 15, illustrated in the figure as a number of cup washers. The stiff spring arrangement may also be provided by extremely hard plastics or gas cushions.

The impact element 8 thus consists of two masses, a driving mass 16 (consisting of the impact piston 2, the nut 11, the chisel rod 10 and the housing 12 rigidly united with each other) and a striking mass 17 (consisting of the chisel 13 and the chisel bit 14 rigidly united with each other), which masses have a limited freedom of axial movement with respect to each other via the stiff spring arrangement 15.

The spring arrangement 15 may naturally consist of some other type of spring than the package of cup washers illustrated in the present example, e.g. rubber springing. However, a stiff steel spring, such as a package of cup washers, offers advantages in that it causes little energy loss in the form of heat.

The air which leaves the driving compartment each time the latter opens is discharged through the impact element 8 via ducts 18*a–e*. The passage of the air through the chisel housing and the chisel is an effective means of removing any heat which may be generated by the action of the spring arrangement 15. Accordingly, the ducts are positioned so that the discharge of pressurized gas from the impact element cools the spring arrangement. This is a particular advantage if rubber or plastic springing is used.

When the chisel bit 14 is brought to bear on a workpiece while the chipping hammer driving mechanism is operating, the workpiece will be subjected to a rapid succession of blows from the chisel bit as the latter reciprocates together with the whole of the impact element 8. Specifically, the cycle of operation will be such that, first, the entire impact element 8 accelerates forwards towards the workpiece. When the chisel meets the workpiece, the striking mass 17 is retarded first, while the driving mass 16 continues pushing forward, thereby compressing the spring arrangement 15. This storage of energy in the spring delays the return motion of the two masses for a brief moment.

Unlike the case of conventional scaling hammers, in which a piston strikes the shank of a chisel, the pulse of force does not travel from the chisel shank down through the chisel, but originates at the impact of the chisel bit on the workpiece. The cycle consists of a wave of compression which travels up the chisel (the striking mass 17) and a tensile wave which passes back down to the chisel bit. The initiation of the tensile wave is delayed since the driving mass 16 continues exerting force via the spring 15 and maintains the compression of the striking mass. The delay of the tensile wave lengthens the duration of the impact, thus increasing the duration of the pulse of force. The spring 15 causes a certain energy loss, which is negligible compared to the kinetic energy of the driving mass transmitted to the chisel bit.

The increased duration of the pulse is achieved mainly at the price of a certain reduction in the maximum level of force. The alteration in the shape of the pulse from what it would be if the impact element 8 consisted of a single rigid mass is determined by the rigidity of the spring and the relative magnitude and position of the masses. Tests with both a sledge-hammer and a scaling hammer have shown that it is preferable to use a driving mass which is considerably greater than the striking mass and to locate the spring arrangement at a distance from the point of impact which is considerably shorter than the overall length of the impact element. Preferably, the weight of the driving mass is at least twice the weight of the striking mass. In a scaling hammer good results have been obtained with an impact element in accordance with this invention, conforming essentially with FIG. 1, in which the weight of the striking mass was only 15–20% of the total weight of the impact device, and in which the spring arrangement was located at a distance from the point of the chisel equal to less than half of the overall length of the impact element and preferably barely one third of the overall length of the impact element.

When the striking mass 17 is caused to impact upon a workpiece, it immediately begins to cut into the workpiece by virtue of its own kinetic energy, which has been imparted to it in the course of the preceding acceleration of the entire impact element 8. This is immediately followed by the successive transmission of the energy of the driving mass by the agency of the spring 15. Thus the spring 15 need not be subjected at the moment of impact to that part of the kinetic energy which is borne by the striking mass itself. It is a further advantage that the striking mass is already moving in the same direction as the spring 15 and the driving mass 16 and has already begun to penetrate the surface of the workpiece when the energy borne by the driving mass begins to be transmitted, since this circumstance naturally makes the transmission process smoother. It also has a desirable effect on the technical performance that the transmission of the additional energy begins at a point when the curve of the pulse has already risen some distance and that the greater part of this additional energy is delivered during the phase in which the maximum force level is reached, so that this level is maintained for a longer period of time, as shown by Curve 2 in FIG. 3. This gives a high energy efficiency.

It will be readily understood that this work cycle implies a great difference in both technical performance and the stresses acting on the spring, compared to a transmission sequence via impact piston—spring—chisel shank—chisel bit in the manner known hitherto. The chisel in the latter case is held essentially still against the workpiece when the cycle begins and cannot begin cutting into the workpiece until a sufficient amount of energy has been stored and transmitted to enable the point of the chisel to overcome the resistance of the material of the workpiece. The force curve thus takes on a shape which is disadvantageous with respect to technical performance and, as mentioned above, both the stresses on the spring and the energy losses are high.

Figure 3:
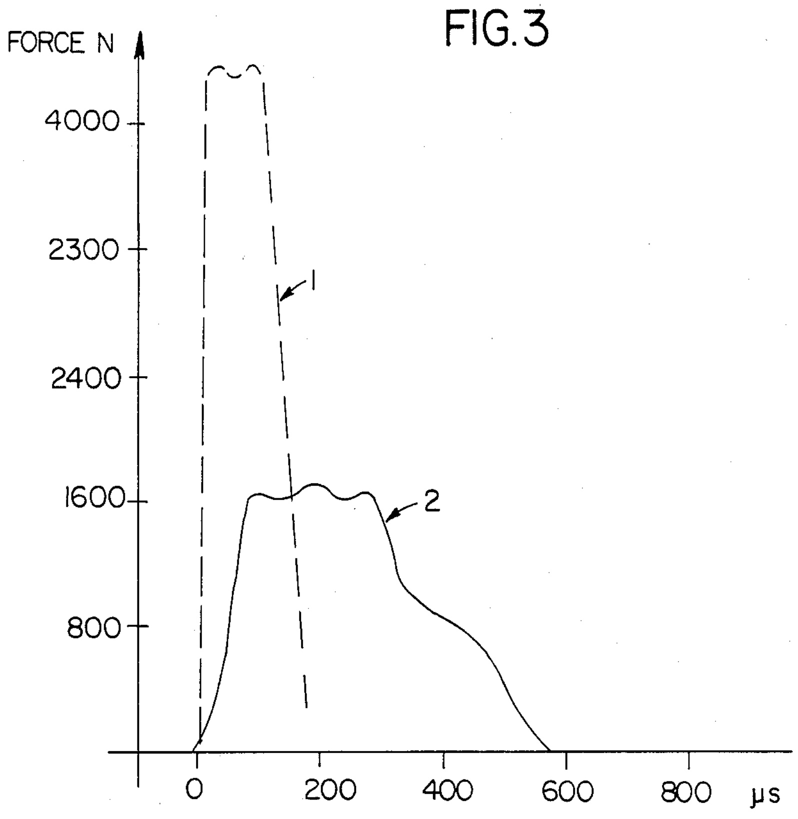
FIG. 3 is a graph showing two different pulse shapes and FIG. 4 is a graph of acoustic measurements.

The shape of the pulse of force above-mentioned, as per Curve 2 in FIG. 3, was obtained by measurements on a scaling hammer equipped with an impact element in accordance with the invention.

Figure 4:
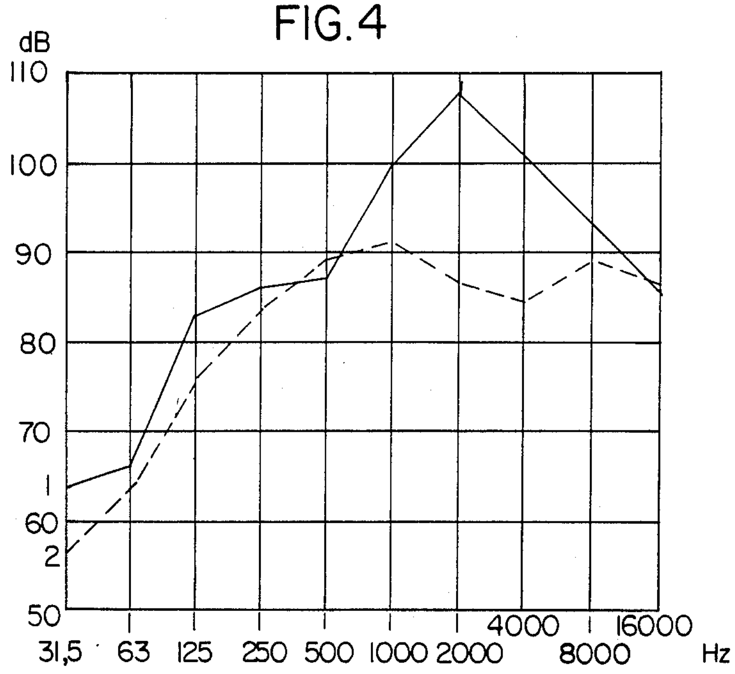

FIG. 4 shows comparative acoustic measurements carried out on a pneumatic scaling hammer working on a flat metal plate resting on a damped surface. Curve 1 was obtained when the scaling hammer was operating with an impact element without an anti-noise spring arrangement and Curve 2 when it was fitted with an impact element in accordance with the present invention. When measured with an A-filter the damping obtained as per Curve 2 represents a value of 13 dB(A).

It is claimed above that it is possible to avoid the excitation of certain frequencies of vibration in the workpiece by modifying the pulse of force. In other words, it is claimed that the workpiece itself—by virtue of its dimensions etc.,—has no critical effect in this respect. This has been substantiated by tests of the same type as those reported in FIG. 4 carried out on a number of workpieces of varying dimensions and having the form of both large faces of metal plate and stiffened angle structures, both freely supported and resting on an acoustically damping surface. In every case the shape of the curves was essentially the same with regard to the damping at the various frequencies of vibration. The damping obtained in dB(A) varied over the range from 9 to 13 dB(A) only, with an average damping of approximately 11 dB(A). Thus it seems clear that a suitably designed impact element in accordance with this invention makes it possible to damp certain defined frequencies without the characteristics of the workpiece having any decisive influence thereon.

A means of further increasing the duration of the pulse of force and improving the chipping action of the tool on the workpiece, in the case of an impact element according to the invention equipped with a chisel, is to increase the plastic penetration of the chisel into the workpiece by providing the chisel with a bit 14 of hard metal. This contributes importantly towards the aim of this invention, namely, for the purpose of damping undesirable sound frequencies, to be able to operate on the workpiece—with satisfactory performance—using a lower maximum level of force and a generally smoother force cycle than in conventionally equipped chipping tools. It has been found quite possible to use such a hard metal bit, made of a fairly tough grade of rock drill steel, on an impact device in accordance with the invention without the metal cracking. On the other hand, such a bit can hardly be used on a scaling hammer or chipping hammer working on the impact piston—chisel shank principle, as the tensile stresses are so great that there is a risk of the bit cracking even with the tool idling. A further advantage obtained with a hard metal bit is that its high resistance to wear greatly increases the life of the chisel.

Figure 2:
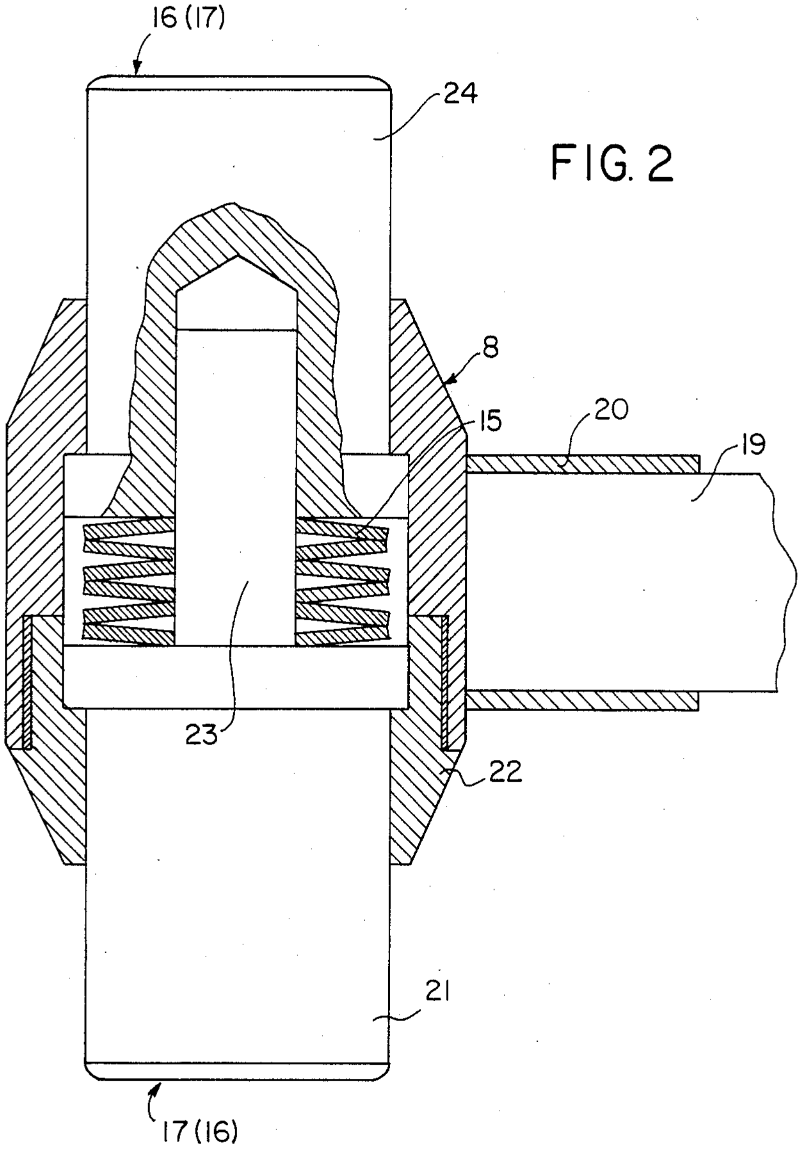
FIG. 2 is a side view, likewise partly cut away, of an application of the invention to a sledge-hammer.

FIG. 2 shows an example of the application of the invention to a hand-powered tool in the form of a sledge-hammer. The sledge-hammer is fitted with a shaft 19 on which the impact element 8 is mounted. The impact element is provided with a shaft mounting 20 and consists of a driving mass 16 and a striking mass 17. Two striking heads 21, 24 are mounted so as to be axially moveable in a casing 22 under back-pressure exerted by a spring arrangement 15. The spring arrangement is axially guided by a pin 23 on the striking head 21. When the striker swings the sledge-hammer so that the head 21 delivers the blow to a workpiece, the head 21 acts as the striking mass 17, while the function of the driving mass 16 is performed by the shaft 19, the shaft mounting 20, the casing 22 and the head 24, which is held by the spring 15 against its seat in the casing 22 and is propelled by the latter, so that the head 24 acts as a unit rigidly united with the casing. If, instead, the striker delivers the blow with the opposite face of the sledge-hammer the head 24 will act as the striking mass 17 and the other components as the driving mass 16. By providing one of the heads with a pin 23 and the other with a matching drilled-out hole, as illustrated in FIG. 2, we obtain different relationships between the weights of the driving and the striking mass, depending on which way round the sledge-hammer is used. One can take advantage of this to obtain damping of different sound frequencies in different types of work. Tests carried out on a large metal plate with a prototype sledge-hammer conforming essentially to FIG. 2 showed that the spring arrangement 15 caused a negligible loss in energy transmission from the sledge-hammer to the plate. It was also found that the sledge-hammer produced a sound spectrum dominated by higher frequencies than in the case of a conventional sledge-hammer. The "ringing" low-frequency sound which usually causes the worst noise nuisance when hammering large plates in big engineering works and at shipyards was thus not excited in the plate. The spring arrangement causes the sledge-hammer to make a smooth, high rebound after each blow. In at least some types of work this is an advantage in that the rebound has a labour-saving effect. Further, thanks to the smooth cycle given by the spring arrangement, no shock wave passes into the hands and arms of the striker. If it should be desired to damp the rebound it is possible to do so in a known manner by filling some part of the sledge-hammer or the lower part of the shaft with lead shot.

The embodiments illustrated are only examples of applications of the invention, and it should be immediately apparent that the invention can also be applied to other types of striking tools and devices than those shown.

We claim:

1. An impact element for an impact tool having impact actuating means, said impact element adapted to reduce the noise generated by said impact tool, said impact element comprising:

a driving mass linearly movable relative to said impact actuating means by a propelling force applied thereto, a striking mass positioned ahead of said driving mass and linearly movable relative to said impact actuating means, spring means disposed between said driving mass and said striking mass for allowing limited relative linear movement between said driving mass and said striking mass, said driving mass, said striking mass, and said spring means being linearly movable, as a whole, relative to said impact actuating means, said driving mass being adapted to exert a force on said striking mass through said spring means when said driving mass is propelled toward a workpiece, said spring means acting on the rear portion of said striking mass, said driving mass being at least twice the weight of said striking mass, said spring means being sufficiently stiff, relative to the weights of said driving and striking masses, so that upon impact between said striking mass and a workpiece, energy is transmitted from said driving mass to said striking mass through said spring means during the phase in which maximum force of impact between said striking mass and said workpiece is attained, whereby the pulse of impact of the striking mass against the workpiece is elongated and damped to decrease the noise level resultant from the impact of said striking mass against said workpiece.

2. The impact element as claimed in claim 1, wherein said spring means includes a cup washer.

3. The impact element as claimed in claim 1, wherein said spring means is formed from hard plastic.

4. The impact element as claimed in claim 1, wherein said spring means are positioned closer to the front end of said impact element than the rear end of said impact element.

5. The impact element as claimed in claim 4, wherein said spring means are positioned within the forward third of the overall length of said impact element.

6. The impact element as claimed in claim 1, further including means for supplying a pressurized gas rearwardly of said driving mass for propelling said driving mass forwardly in said impact tool and at least one duct provided in said impact element forwardly of said means for supplying a pressurized gas for discharging said pressurized gas from said impact element, said at least one duct being positioned so that discharge of said pressurized gas from said impact element cools said spring means.

7. The impact element as claimed in claim 1, wherein said striking element includes a chisel and said impact element includes means for receiving said chisel at the forward end thereof.

8. The impact element as claimed in claim 7, wherein said chisel includes a bit formed from a hard metal.

* * * * *